US012780284B2

(12) United States Patent
De Haas

(10) Patent No.: US 12,780,284 B2
(45) Date of Patent: Nov. 3, 2026

(54) FOLDABLE STROLLER

(71) Applicant: HAAS KRAAN B.V., Acquoy (NL)

(72) Inventor: Fortunatus Johannes De Haas, Acquoy (NL)

(73) Assignee: HAAS KRAAN B.V., Acquoy (NL)

( * ) Notice: Subject to any disclaimer, the term of this patent is extended or adjusted under 35 U.S.C. 154(b) by 242 days.

(21) Appl. No.: 18/702,018

(22) PCT Filed: Nov. 2, 2022

(86) PCT No.: PCT/NL2022/050616
§ 371 (c)(1),
(2) Date: Apr. 17, 2024

(87) PCT Pub. No.: WO2023/080780
PCT Pub. Date: May 11, 2023

(65) Prior Publication Data

US 2024/0409145 A1 Dec. 12, 2024

(30) Foreign Application Priority Data

Nov. 3, 2021 (NL) ..................................... 2029603

(51) Int. Cl.
*B62B 7/08* (2006.01)
*B62B 7/06* (2006.01)

(52) U.S. Cl.
CPC .............. *B62B 7/086* (2013.01); *B62B 7/064* (2013.01); *B62B 2205/04* (2013.01)

(58) Field of Classification Search
CPC ........... B62B 7/086; B62B 7/08; B62B 7/064; B62B 7/06; B62B 2205/04
See application file for complete search history.

(56) References Cited

U.S. PATENT DOCUMENTS 7,114,743 B2 10/2006 Kassai et al.
8,104,788 B2 * 1/2012 Cone, II .................. B62B 7/086 280/642

(Continued)

FOREIGN PATENT DOCUMENTS

CN 200942792 Y 9/2007
CN 100357145 C 12/2007

(Continued)

OTHER PUBLICATIONS

International Search Report for International Application No. PCT/NL2022/050616.

(Continued)

*Primary Examiner* — John D Walters
(74) *Attorney, Agent, or Firm* — Perilla Knox & Hildebrandt LLP; Kenneth A. Knox

(57) ABSTRACT

A foldable stroller, movable between an unfolded state and a folded state, comprising: a central frame element (101) extending in a lateral direction of said stroller; a front wheel frame element (102) which is at one outer end pivotably connected to said central frame element (101) around a first axis, which first axis extends in said lateral direction, and comprising at least one front wheel (121) at its other outer end; a push bar connector frame element (103) which at one outer end is pivotably connected to said central frame element (101) around a second axis, which second axis extends in said lateral direction, and which at its other outer end comprises a push bar frame element (105) with a push bar (151); a first and second rear wheel frame element (104) each connected to said central frame element (101) at one outer end, and each comprising a rear wheel (141) at their other outer end; wherein said first and second rear wheel frame element (104) is each pivotably connected to respective opposite outer lateral ends of said central frame element (101) around respective third and fourth axes, which third (Continued)

Figure 1:
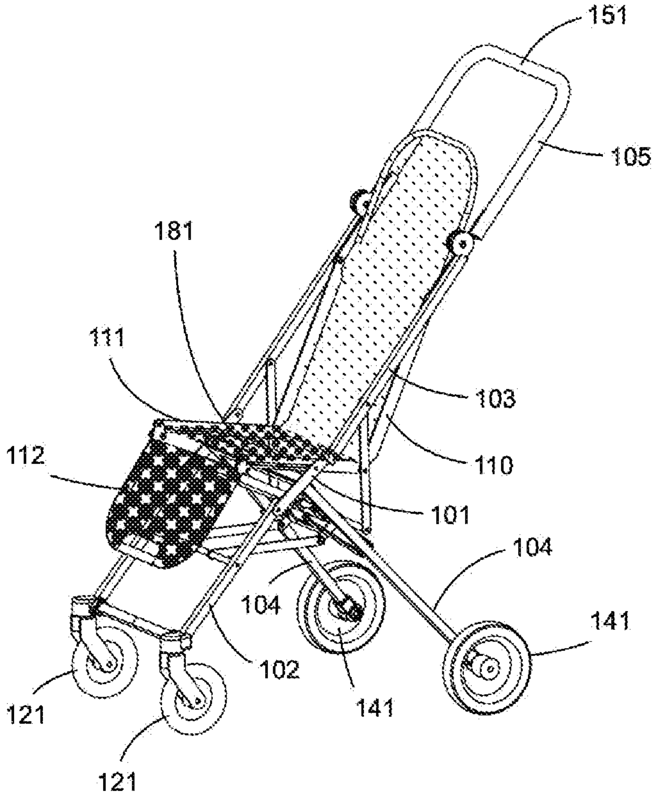

and fourth axes extend mutually substantially parallel and substantially perpendicular to said first and second axes; such that a pivoting movement of said front wheel frame (102) element and said push bar connector frame element (103) from the unfolded state towards each other in the folded state results in said first and second rear wheel frame elements (104) being pivoted from the unfolded state towards each other in the folded state, and vice versa.

14 Claims, 4 Drawing Sheets

(56) References Cited

U.S. PATENT DOCUMENTS

| | | | | |
|---|---|---|---|---|
| 8,172,254 | B2 | 5/2012 | Park et al. | |
| 8,408,580 | B2 * | 4/2013 | Liao | B62B 7/062 280/647 |
| 8,894,090 | B1 | 11/2014 | Chen | |
| 9,505,423 | B2 * | 11/2016 | Thorne | B62B 9/26 |
| 9,834,243 | B1 | 12/2017 | Zhang | |
| 9,902,417 | B2 * | 2/2018 | Storm | B62B 7/083 |
| 9,988,064 | B2 | 6/2018 | Liao | |
| 10,167,008 | B1 | 1/2019 | Yang | |
| 10,435,057 | B2 * | 10/2019 | Gorza | B62B 7/086 |
| 11,332,180 | B2 * | 5/2022 | Crumrine | B62B 7/086 |
| 2008/0054601 | A1 | 3/2008 | Li | |
| 2011/0227373 | A1 | 9/2011 | Cone, II | |
| 2012/0187660 | A1 | 7/2012 | Liao | |
| 2015/0239485 | A1 | 8/2015 | Thorne et al. | |
| 2016/0144879 | A1 | 5/2016 | Storm et al. | |
| 2021/0229727 | A1 | 7/2021 | Crumrine et al. | |

FOREIGN PATENT DOCUMENTS

| | | | |
|---|---|---|---|
| CN | 1765674 | A | 2/2008 |
| CN | 101284542 | A | 6/2010 |
| CN | 101734272 | A | 11/2011 |
| CN | 102416974 | A | 8/2013 |
| CN | 103448776 | A | 12/2013 |
| CN | 102458959 | A | 7/2014 |
| CN | 103917430 | A | 6/2016 |
| CN | 106275037 | A | 1/2017 |
| CN | 106364541 | A | 2/2017 |
| CN | 106515833 | A | 3/2017 |
| CN | 106741094 | A | 5/2017 |
| CN | 106864533 | A | 6/2017 |
| CN | 107264600 | A | 10/2017 |
| CN | 107298124 | A | 10/2017 |
| CN | 107901977 | A | 11/2017 |
| CN | 107444457 | A | 12/2017 |
| CN | 105398482 | A | 1/2018 |
| CN | 107650993 | A | 2/2018 |
| CN | 107757693 | A | 3/2018 |
| CN | 107813859 | A | 3/2018 |
| CN | 107856727 | A | 3/2018 |
| CN | 107985381 | A | 5/2018 |
| CN | 108016481 | A | 5/2018 |
| CN | 108082249 | A | 5/2018 |
| CN | 108216342 | A | 6/2018 |
| CN | 108263463 | A | 7/2018 |
| CN | 108313111 | A | 7/2018 |
| CN | 108313113 | A | 7/2018 |
| CN | 108327770 | A | 7/2018 |
| CN | 108382449 | A | 8/2018 |
| CN | 108423057 | A | 8/2018 |
| CN | 108502005 | A | 9/2018 |
| CN | 108528511 | A | 9/2018 |
| CN | 108583670 | A | 9/2018 |
| CN | 108688709 | A | 10/2018 |
| CN | 109017956 | A | 12/2018 |
| CN | 109131521 | A | 1/2019 |
| CN | 109278834 | A | 1/2019 |
| CN | 109278839 | A | 1/2019 |
| CN | 109455215 | A | 3/2019 |
| CN | 109625069 | A | 4/2019 |
| CN | 110217283 | A | 9/2019 |
| CN | 110588758 | A | 12/2019 |
| CN | 110667684 | A | 1/2020 |
| CN | 110937010 | A | 3/2020 |
| CN | 106882217 | A | 11/2023 |
| DE | 102013107139 | A1 | 1/2015 |
| EP | 0719693 | A2 | 9/1996 |
| EP | 1488981 | A1 | 12/2004 |
| EP | 1491421 | A1 | 9/2006 |
| EP | 1967440 | A2 | 6/2010 |
| EP | 2190716 | A1 | 6/2010 |
| EP | 3184401 | A1 | 5/2019 |
| EP | 3517400 | A1 | 7/2019 |
| FR | 3035368 | A1 | 10/2018 |
| JP | 2005247218 | A | 9/2005 |
| JP | 2017087893 | A | 12/2019 |
| TW | M521572 | U | 5/2016 |
| TW | M574578 | U | 2/2019 |
| WO | 2006116900 | A1 | 11/2006 |
| WO | 2017009345 | A1 | 1/2017 |

OTHER PUBLICATIONS

Written Opinion for International Application No. PCT/NL2022/050616.

* cited by examiner

FOLDABLE STROLLER

The present application is a national phase application under 35 U.S.C. § 371 of International Application No. PCT/NL2022/050616 entitled "FOLDABLE STROLLER," filed on Nov. 2, 2022, which claims the benefit of and priority to Netherlands Patent Application No. 2029603 filed Nov. 3, 2021, the contents of both of which being incorporated by reference in their entireties herein.

The present invention relates to a foldable stroller, movable between an unfolded state and a folded state, comprising:

a central frame element extending in a lateral direction of said stroller;

a front wheel frame element which is at one outer end pivotably connected to said central frame element around a first axis, which first axis extends in said lateral direction, and comprising at least one front wheel at its other outer end;

a push bar connector frame element which is at one outer end pivotably connected to said central frame element around a second axis, which second axis extends in said lateral direction, and comprising a push bar frame element comprising a push bar at its other outer end;

a first rear wheel frame element and a second rear wheel frame element, each connected to said central frame element at one outer end, and each comprising a rear wheel at their other outer end.

Such a foldable stroller is disclosed in U.S. Pat. No. 9,834,243 B1. There is a general need for strollers which can easily and quickly folded to compact dimensions. For instance, there are maximum dimensions in the aviation industry prescribed for hand luggage. These dimensions depend on the airline, and may vary for instance between a more generous 56 cm×45 cm×25 cm to a more restricted 55 cm×36 cm×20 cm. Ideally a stroller can be easily and quickly folded to dimensions which are smaller than or equal to the more restricted requirements, such that the stroller can be carried as cabin luggage, and furthermore the payment of extra luggage fees can be avoided, with most airlines. At the same time there exists a requirement that in the unfolded state the dimensions of the stroller are large enough for safe and easy operation of the stroller. The seat of the stroller must be wide enough for a child to sit comfortably, for instance at least 30 cm. The push bar of the stroller must extend sufficiently high, for instance at least 103, so that people can push the stroller while walking upright. The wheel base of the stroller must be large enough in order to comply with stability and safety requirements, which may be for instance at least 40 cm, and preferably the wheel base is even wider, such as at least 54 cm.

The length of the wheel base must also be sufficiently large, for instance at least 45 cm. The current invention aims to provide a easily and/or quickly foldable stroller, which is robust and safe, and which satisfies the above size requirements.

To this end, a foldable stroller according to the preamble is characterized in that said first rear wheel frame element and said second rear wheel frame element are each pivotably connected to respective opposite outer lateral ends of said central frame element around respective third and fourth axes, which third and fourth axes extend mutually substantially parallel and substantially perpendicular to said first and second axes;

a first outer end of at least one first linkage bar is pivotably connected to said front wheel frame element at a distance from said first axis and a second outer end of said first linkage bar is pivotably connected to a movable connector element which extends between said first rear wheel frame element and said second rear wheel frame element;

a first outer end of at least one second linkage bar is pivotably connected to said push bar connector frame element at a distance from said second axis and a second outer end of said second linkage bar is pivotably connected to said movable connector element; and first outer ends of respective third linkage bars are pivotably connected to each of said respective rear wheel frame elements at a distance from said third and fourth axes and second outer ends of said respective third linkage bars are pivotably connected to said movable connector element;

such that a pivoting movement of said front wheel frame element and said push bar connector frame element from the unfolded state towards each other in the folded state results in said first rear wheel frame element and said second rear wheel frame element being pivoted from the unfolded state towards each other in the folded state, and vice versa.

Hereby the rear wheels are automatically pivoted towards each other when the stroller is being folded. In that manner the wheels may have a mutual distance which is equal to or smaller than the width of the central frame element in the folded state, and in the unfolded state the mutual distance may be substantially larger than the width of the central frame element. The width of the central frame element, on which the seat may be mounted, and the distance between the rear wheels in the folded state, can thus be smaller than 36 cm (falling within the scope of the maximum width for hand luggage), while the distance between the rear wheels in the unfolded state can be substantially larger, for instance 54 cm. The design of the current invention removes for instance the need to fold the central frame element and the seat, as is the case for other strollers.

According to a preferred embodiment, said central frame element is substantially H-shaped, comprising a central bar in said lateral direction and two mutually parallel bars, each at one outer end of said central bar each extending perpendicular to said central bar, wherein the outer ends of said front wheel frame element and said push bar connector frame element are connected to the outer ends of the parallel bars and the outer ends of the rear wheel frames are connected to the outer ends of the central bar.

According to a preferred embodiment, said push bar frame element comprising said push bar is pivotably connected to said push bar connector frame element around a fifth axis, which fifth axis extends in said lateral direction.

According to a preferred embodiment, said push bar frame element and said push bar form a substantially U-shaped element comprising a central bar forming said push bar and two mutually parallel bars each connected at a first outer end to said central bar, and each of said parallel bars is pivotably connected to said push bar connector frame element around said fifth axis.

According to a preferred embodiment, the other outer ends of said parallel bars of said push bar frame element extend beyond said fifth axis, and said other outer ends are pivotably connected to first outer ends of parallel bars of a backrest frame element, and the other outer end of said parallel bars of said backrest frame element are pivotably connected to said at least one second linkage bar at a location between, and at a distance from, the outer ends of said at least one second linkage bar.

According to a preferred embodiment, a seat frame element, forming part of a seat on which a child can sit, comprising two parallel bars at its lateral sides, is connected to said central frame element.

According to a preferred embodiment, said two parallel bars of said seat frame element are each at one end pivotably connected to said outer ends of said parallel bars of said backrest frame element, and said two parallel bars of said seat frame element are each slidingly connected to said central frame element.

According to a preferred embodiment, a footrest frame, forming part of a footrest, is pivotably connected to said seat frame.

According to a preferred embodiment, said footrest is provided with a handle arranged to be engaged by a hand of a user.

According to a preferred embodiment, said front wheel frame element comprises two wheels at said other outer end, each extending near a longitudinal vertical plane through the lateral outer ends of the central frame element of the stroller, such that the stroller forms a quadricycle.

According to an alternative preferred embodiment, said front wheel frame element comprises a single wheel at said other outer end, extending in the central longitudinal vertical plane of the stroller, such that the stroller forms a tricycle.

Figure 2:
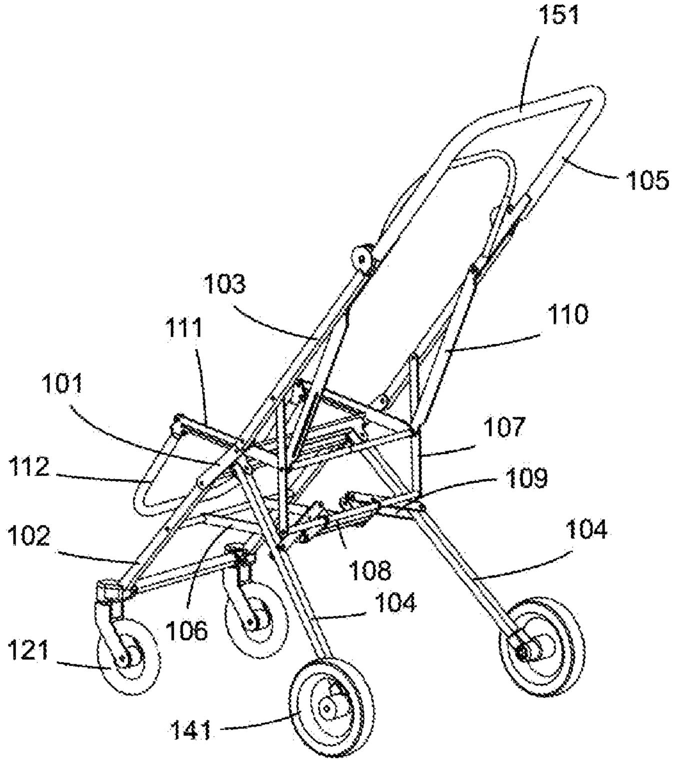
Figure 3A:
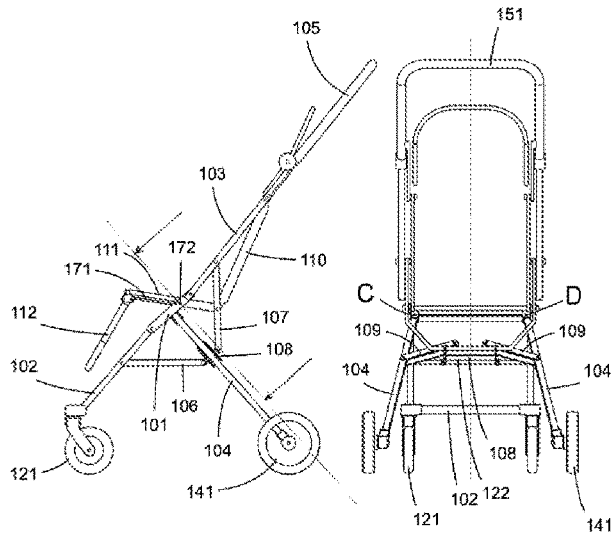
Figure 3B:
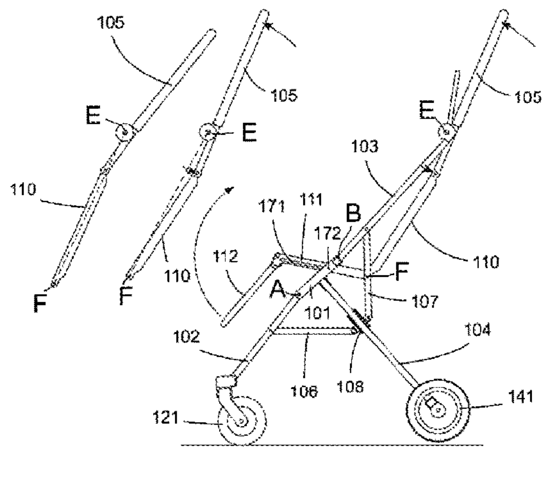
Figure 3C:
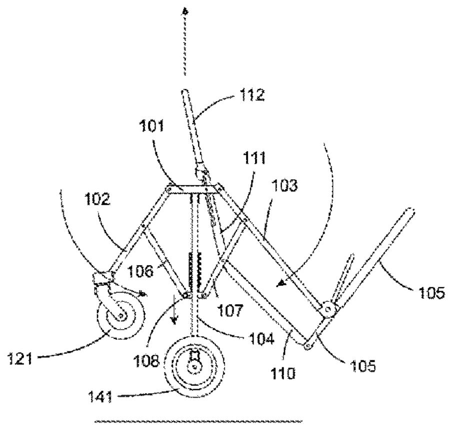
Figure 3D:
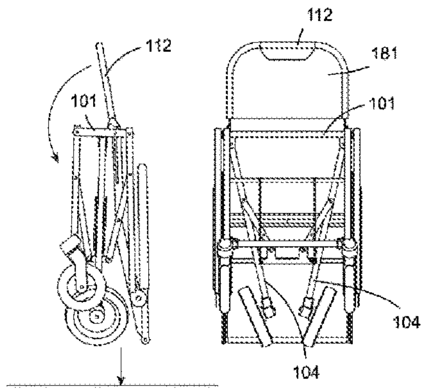
Figure 3E:
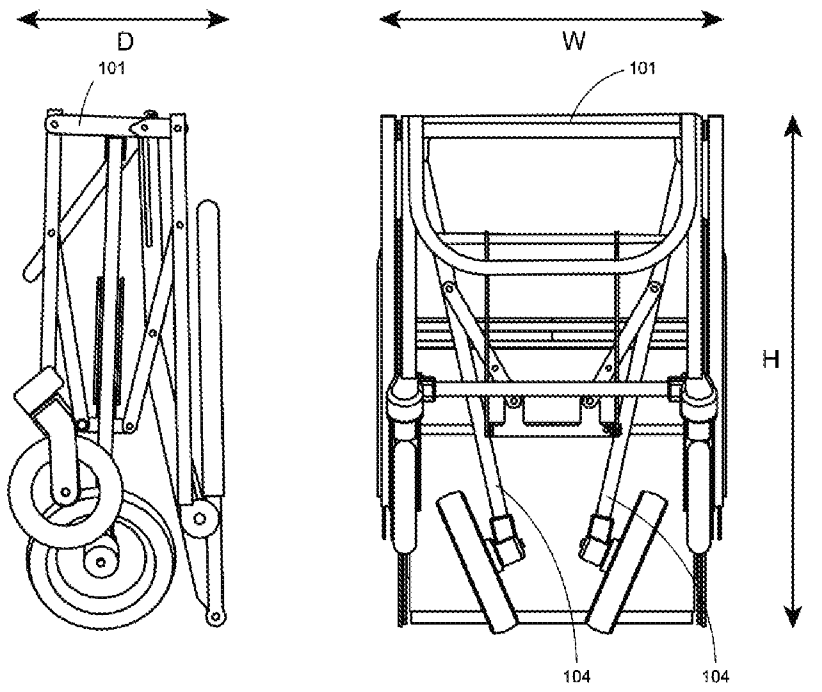
Figure 4A:
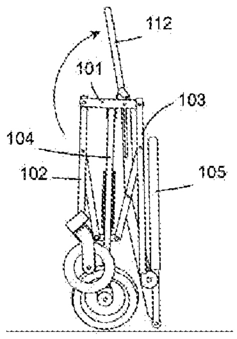
Figure 4B:
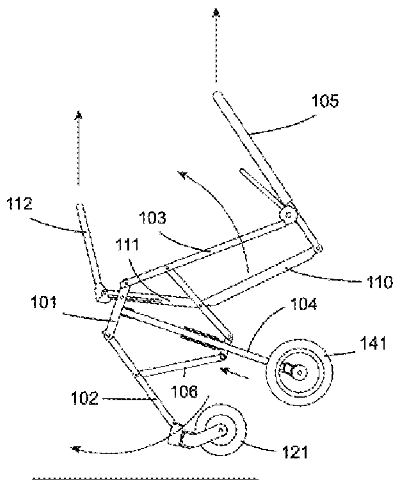
Figure 4C:
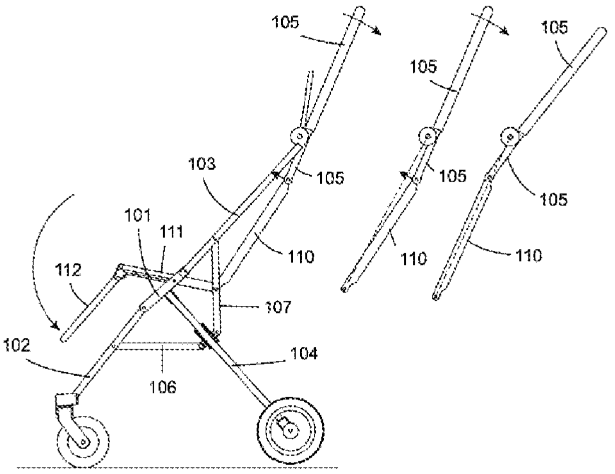
Figure 5A:
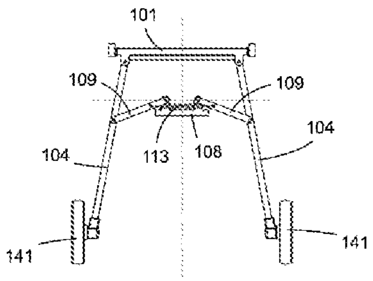
Figure 5B:
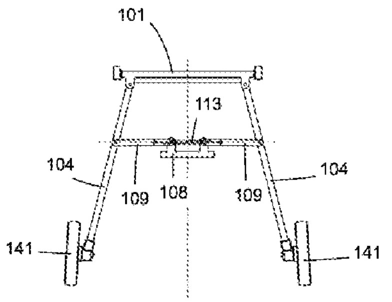
Figure 5C:
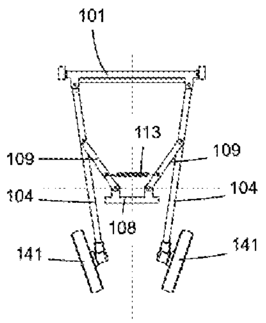
Figure 6A:
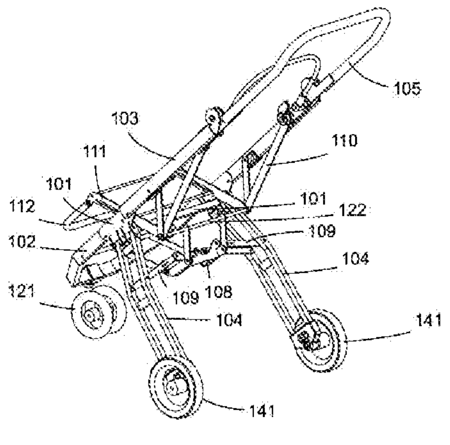
Figure 6B:
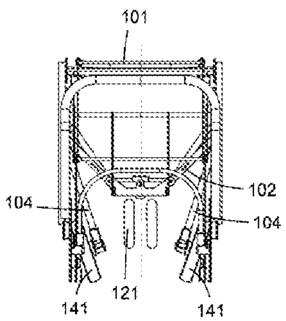

The present invention will now be illustrated with reference to the drawing where FIG. 1 is a perspective view of a first embodiment of a foldable stroller in an unfolded state;

FIG. 2 is a perspective view of the stroller of FIG. 1 without seat fabric in the unfolded state;

FIG. 3*a* is a respective side view and rear view of the stroller of FIG. 2 in the unfolded state;

FIG. 3*b* is a side view of the stroller in a first stage between the unfolded state and a folded state;

FIG. 3*c* is a side view of the stroller in a second stage between the unfolded state and the folded state;

FIG. 3*d* is a respective side view and rear view of the stroller in a first stage of the folded state;

FIG. 3*e* is a respective side view and rear view of the stroller in a final stage of the folded state;

FIG. 4*a* is a side view of the stroller in a first stage between the folded state and the unfolded state;

FIG. 4*b* is a side view of the stroller in a second stage between the folded state and the unfolded state;

FIG. 4*c* is a side view of the stroller in a third stage between the folded state and the unfolded state;

FIG. 5*a* is a partial rear view of the stroller of FIG. 2 in the unfolded state of FIG. 3A;

FIG. 5*b* is a partial rear view of the stroller in a stage between the unfolded state and the folded state;

FIG. 5*c* is a partial rear view of the stroller in the folded state of FIG. 3E;

FIG. 6*a* is a perspective view of a second embodiment of a stroller without seat fabric in an unfolded state; and FIG. 6*b* is a perspective view of the stroller of FIG. 6A in a folded state.

According to FIGS. 1 and 2 a foldable stroller comprises an H-shaped central frame element 101, comprising a horizontal central bar in lateral direction and two mutually parallel bars, each at one outer end of said central bar and each extending perpendicular to said central bar.

A U-shaped front wheel frame element 102 comprises a horizontal central bar at the bottom and two mutually parallel bars perpendicular thereto. Each parallel bar of the front wheel frame element 102 is pivotably connected at their outer end to a respective parallel bar of the central frame element 101, around a first axis A which extends in the lateral direction. Two front wheels 121, which are preferably caster wheels, are mounted at the bottom lateral sides of the front wheel frame element 102.

A push bar connector frame element 103 comprises two parallel bars. One outer end of each parallel bar of the push bar connector frame element 103 is pivotably connected to an outer end of a respective parallel bar of the central frame element 101 around a second axis B which also extends in the lateral direction.

A first rear wheel frame element 104 and a second rear wheel frame element 104 are each pivotably connected to respective outer ends of the central bar of the central frame element 101 around respectively a third axis C and a fourth axis D. The third axis C and the fourth axis D extend mutually substantially parallel and each substantially perpendicular to the first axis A and the second axis B. A rear wheel 141 is mounted at the outer end of each rear wheel frame element 104.

A U-shaped push bar frame element 105, comprising a central bar forming a push bar 151 and two mutually parallel bars perpendicular thereto. Each parallel bar of the push bar frame element 105 is pivotably connected to a the other outer end of a respective parallel bar of the push bar connector frame element 103 around a fifth axis E which extends in the lateral direction.

A linkage system comprising two first linkage bars 106, two second linkage bars 107 and two third linkage bars 109 are provided, which are mutually connected by means of a movable connector element 108. To that end the movable connector element 108, for instance as shown in FIG. 6A, is comprised of a frame having (at least) six spaced apart connectors at suitable locations for hingedly connecting the outer ends of the respective linkage bars 106, 107, 109. The movable connector element 108 is only connected with linkage bars 106, 107, 109 and not directly attached to any frame element, and is moved up and down between and relative to the frame elements when the stroller is being folded and unfolded.

A first outer end of each first linkage bar 106 is pivotably connected to the front wheel frame element 102 at a distance from said first axis A by means of a horizontal mounting bar 122 which connects the central parts of the parallel bars of the front wheel frame element 102, and a second outer end of each first linkage bar 106 is pivotably connected to a movable connector element 108 which extends between said rear wheel frame elements.

A first outer end of each second linkage bar 107 is pivotably connected to the push bar connector frame element 103 at a distance from the second axis B, and a second outer end of each second linkage bar 107 is pivotably connected to the movable connector element 108.

A first outer end of each third linkage bar 109 is pivotably connected to a respective rear wheel frame element 104 at a distance from said third axis C and fourth axis D, and a second outer end of each third linkage bar 109 is pivotably connected to the movable connector element 108.

Due to this linkage system a pivoting movement of the front wheel frame element 102 and the push bar connector frame element 103 from the unfolded state towards each other in the folded state results in the rear wheel frame elements being pivoted from the unfolded towards each other in the folded position, as shown in FIGS. 3A-3E, and vice versa as shown in FIGS. 4A-4C.

A mechanism to force the pivoting movement of the front wheel frame element 102 and the push bar connector frame element 103 from the unfolded state towards each other in the folded state is formed by a mechanism which also forms a frame for the seat of the stroller. To that end the outer ends of the parallel bars of the push bar frame 105 element extend beyond the fifth axis E, and said outer ends are pivotably connected to first outer ends of parallel bars of a backrest frame element 110. The other outer ends of said parallel bars of said backrest frame 110 element are pivotably connected to a respective second linkage bar 107 at a location between, and at a distance from, the outer ends of said second linkage bar 107, such that when the push bar frame element 105 is folded as shown by the upper arrow in FIG. 3B each linkage bar 107 is pulled by the backrest frame element 110.

A seat frame element 111 comprises two parallel bars at its lateral sides, which are each at one end pivotably connected to the outer ends of the parallel bars of the backrest frame element 110, and furthermore said two parallel bars of the seat frame element 111 are each slidingly connected to the central frame element 101 by means of a slot 171 in said parallel bars which each slide over a pin 172 on the parallel bars of the central frame element 101, which pins 172 are located between the central bar and the outer ends which are connected to the push bar connector frame element 103. The movement of the linkage bars 107 force the seat frame element 111 to slide backwards, such that the protruding front part of the seat frame element 111 is pulled inwards, such that it does not stick out in the folded state.

A footrest frame 112 is pivotably connected to the seat frame 111, and can either be folded towards the other folded frame elements for a compact configuration, or be folded away therefrom in order to form a carrying handle.

As shown in FIGS. 3B-3E the stroller can be folded by pulling both the 105 and the 112 towards each other, and in the final step fold the footrest frame element 112 towards the front wheel frame element 102.

As shown in the detailed upper left corner of FIG. 3B, in the unfolded state the length of the combined parts of the push bar frame element 105 and the backrest frame element 110 between the hinge point E and the hinge point F is slightly longer than the straight line between the hinge points E, F, which are held at a relatively fixed distance from each other by the other frame elements. Thereby a tension force is present between said hinge points E, F which hold the frame parts in the unfolded state, and only by pulling hard enough the frame elements 105, 110 will be forced to mutually hinge towards the folded state (and vice versa, as shown in FIG. 4C). The back rest (which is formed by a seat fabric 181 which is attached to both the backrest frame element 110 and the lower part of the push bar frame element 105) will be folded together with the folding of the respective frame elements 105, 110.

In the folded state as shown in FIG. 3E the stroller may have compact dimensions D, W, H which comply with maximum dimensions as required in the aviation industry. In this quadricycle embodiment of the stroller the rear wheels 141 extend between the front wheels 121 in the folded state.

In order to unfold the stroller, as shown in FIGS. 4A-4B, the footrest frame element 112 is folded up and the footrest frame element 112 and the push bar frame element 105 are both pulled upwards.

As shown in FIGS. 5A-5C a tension spring 113 is attached to each third linkage bar 109 at a distance of the pivotable connection with the connector element 108, arranged to pull said third linkage bars 109 towards each other when the linkage bars 109 extend either below or above the aligned position as shown in FIG. 5B. Thereby the stroller is either pulled and held in the unfolded state as shown in FIG. 5A or pulled and held in the folded state as shown in FIG. 5C.

As shown in FIG. 1 a seat fabric 181 is attached to the backrest frame element 110, the seat frame element 111 and the footrest frame element 112 so as to form the seat of the stroller.

As shown in FIGS. 6A and 6B in an alternative embodiment the front wheel frame 102 has a generally V-shape, and only one caster front wheel 121 is mounted at the point of the V-shape front wheel frame 102, whereby the stroller is a tricycle. In the folded state the front wheel 121 extends between the rear wheels 141.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A foldable stroller, movable between an unfolded state and a folded state, comprising:
- a central frame element extending in a lateral direction of the stroller;
- a front wheel frame element which is at one outer end pivotably connected to the central frame element around a first axis, which first axis extends in the lateral direction, and comprising at least one front wheel at its other outer end;
- a push bar connector frame element which is at one outer end pivotably connected to the central frame element around a second axis, which second axis extends in the lateral direction, and comprising a push bar frame element comprising a push bar at its other outer end;
- a first rear wheel frame element and a second rear wheel frame element, each connected to the central frame element at one outer end, and each comprising a rear wheel at their other outer end; wherein:
- the first rear wheel frame element and the second rear wheel frame element are each pivotably connected to respective opposite outer lateral ends of the central frame element around respective third and fourth axes, which third and fourth axes extend mutually substantially parallel and substantially perpendicular to the first and second axes;
- a first outer end of at least one first linkage bar is pivotably connected to the front wheel frame element at a distance from the first axis and a second outer end of the first linkage bar is pivotably connected to a movable connector element which extends between the first rear wheel frame element and the second rear wheel frame element;
- a first outer end of at least one second linkage bar is pivotably connected to the push bar connector frame element at a distance from the second axis and a second outer end of the second linkage bar is pivotably connected to the movable connector element; and first outer ends of respective third linkage bars are pivotably connected to each of the respective rear wheel frame elements at a distance from the third and fourth axes and second outer ends of the respective third linkage bars are pivotably connected to the movable connector element, such that a pivoting movement of the front wheel frame element and the push bar connector frame element from the unfolded state towards each other in the folded state results in the first rear wheel frame element and the second rear wheel frame element being pivoted from the unfolded state towards each other in the folded state, and vice versa.

2. The foldable stroller according to claim 1, wherein the central frame element is substantially H-shaped, comprising a central bar in the lateral direction and two mutually parallel bars, each at one outer end of the central bar each extending perpendicular to the central bar, wherein the outer ends of the front wheel frame element and the push bar connector frame element are connected to the outer ends of the parallel bars and the outer ends of the rear wheel frames are connected to the outer ends of the central bar.

3. The foldable stroller according to claim 2, wherein the push bar frame element comprising the push bar is pivotably connected to the push bar connector frame element around a fifth axis, which fifth axis extends in the lateral direction.

4. The foldable stroller according to claim 1, wherein the push bar frame element comprising the push bar is pivotably connected to the push bar connector frame element around a fifth axis, which fifth axis extends in the lateral direction.

5. The foldable stroller according to claim 1, wherein the push bar frame element and the push bar form a substantially U-shaped element comprising a central bar forming the push bar and two mutually parallel bars each connected at a first outer end to the central bar, and each of the parallel bars is pivotably connected to the push bar connector frame element around the fifth axis.

6. The foldable stroller according to claim 5, wherein the other outer ends of the parallel bars of the push bar frame element extend beyond the fifth axis, and the other outer ends are pivotably connected to first outer ends of parallel bars of a backrest frame element, and the other outer end of the parallel bars of the backrest frame element are pivotably connected to the at least one second linkage bar at a location between, and at a distance from, the outer ends of the at least one second linkage bar.

7. The foldable stroller according to claim 1, wherein a seat frame element, forming part of a seat on which a child can sit, comprising two parallel bars at its lateral sides, is connected to the central frame element.

8. The foldable stroller according to claim 7, wherein the two parallel bars of the seat frame element are each at one end pivotably connected to the outer ends of the parallel bars of the backrest frame element, and the two parallel bars of the seat frame element are each slidingly connected to the central frame element.

9. The foldable stroller according to claim 8, wherein a footrest frame, forming part of a footrest, is pivotably connected to the seat frame.

10. The foldable stroller according to claim 7, wherein a footrest frame, forming part of a footrest, is pivotably connected to the seat frame.

11. The foldable stroller according to claim 10, wherein the footrest is provided with a handle arranged to be engaged by a hand of a user.

12. The foldable stroller according to claim 7, wherein the two parallel bars of the seat frame element are each at one end pivotably connected to the outer ends of the parallel bars of the backrest frame element, and the two parallel bars of the seat frame element are each slidingly connected to the central frame element.

13. The foldable stroller according to claim 1, wherein the front wheel frame element comprises two wheels at the other outer end, each extending near a longitudinal vertical plane through the lateral outer ends of the central frame element of the stroller, such that the stroller forms a quadricycle.

14. The foldable stroller according to claim 1, wherein the front wheel frame element comprises a single wheel at the other outer end, extending in a central longitudinal vertical plane of the stroller, such that the stroller forms a tricycle.

* * * * *